United States Patent Office 3,542,880
Patented Nov. 24, 1970

3,542,880
TRIFLUOROMETHYL-NITRO-DIPHENYL SULFIDES
Otto Rohr, Therwil, and Heinz Siegle, Binningen, Switzerland, assignors to Ciba Limited, Basel, Switzerland, a company of Switzerland
No Drawing. Filed Mar. 5, 1968, Ser. No. 710,645
Claims priority, application Switzerland, Mar. 8, 1967, 3,392/67
Int. Cl. C07c *149/37*; A01n *9/12*
U.S. Cl. 260—609
6 Claims

ABSTRACT OF THE DISCLOSURE

The invention describes new thiodiphenyl ethers of the general formula

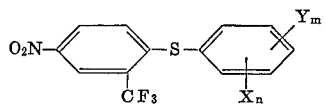

the various meanings of X, Y, m and n of which are given in the disclosure, and their use in pesticidal preparations. Especially good activity is shown against bacteria and fungi.

---

The present invention relates to compounds, a process for their manufacture and pesticidal preparations containing them, especially to preparations for combating phytopathogenic bacteria and fungi.

The present invention provides compounds of general formula:

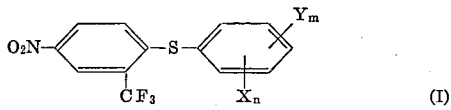
(I)

wherein X represents a halogen atom, an alkyl group having 1 to 12 carbon atoms or the groups —OCH$_3$, NO$_2$ or CF$_3$, Y represents a halogen atom or a lower alkyl group having 1 to 4 carbon atoms, and n or m represents the numbers 0 to 3, the sum of n and m being not more than 5.

The present invention also provides a pesticidal preparation, which comprises a compound of the above mentioned general formula together with at least one of the following additives: a solvent, a diluent, a dispersing agent, a wetting agent and an adhesive, as well as other pesticides. The new preparations which contain as the active substance, the compound of formula

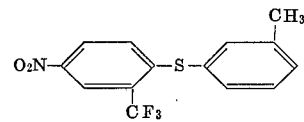

or

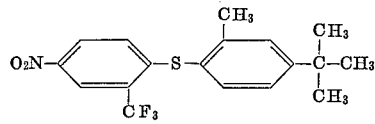

are especially effective in combating phytopathogenic bacteria and fungi.

The invention furthermore provides the following process for the manufacture of the new compounds of general Formula I. The new compounds of general Formula I are manufactured by reacting 2-trifluoromethyl-4-nitrochlorobenzene with a compound of general formula

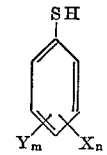

wherein X, Y, n and m have the significance given above, with elimination of hydrogen chloride, in the presence of an acid acceptor, preferably an alkali hydroxide, optionally in a polar solvent, at a temperature within the range of from 0° to 200° C.

The compounds having the formula given above and the preparations containing them are especially effective against phytopathogenic bacteria and fungi. They however also show an activity against fungi which for example cause the rotting of textiles, and further against human-pathogenic bacteria and fungi, also against worms, for example nematodes, human-pathogenic and animal-pathogenic helminths, insects and insect eggs, against members of the order Acarina (mites and ticks), against gastropodes and against water pests.

When used in larger quantities, the preparations which contain the active substances of Formula I may also be employed for combating undesired plants and for the defoliation of useful plants.

The new preparations which contain the active substances of Formula I may be employed in various ways.

Aqueous sprays may for example be manufactured on the basis of an emulsifiable concentrate or a wettable powder. A suitable emulsifiable concentrate can, for example, be manufactured from approximately 25 parts of a compound of Formula I, 40–50 parts of diacetone-alcohol or isophorone, 20–30 parts of an aromatic petroleum product, xylene, toluene or some other mixture of such solvents, and 2–10 parts of one or more emulsifiers. It is also possible to use small quantities of a material which assists the formation of a homogeneous solution, for example, methanol, methoxymethanol or butoxymethanol.

A suitable emulsifier may, for example, be manufactured from 1–1.5 parts of calcium or sodium dodecylbenzenesulphonate, 2.5–4 parts of an octyl- or nonylphenoxy-polyethoxy-ethanol, as well as approximately 0.5–1 part of methanol and 0–0.8 part of xylene. The resulting mixture is added to the solvents and to the active substance of Formula I in the quantity ratio given above. However it is also possible to use one or more other surface-active agents.

It is possible to use any such agent, for example, an anionic or cationic or non-ionic emulsifier which is soluble in solvents, the choice being dependent on whatever is appropriate in each case. Instead of the abovementioned non-ionic agents derived from an alkylphenol and ethylene oxide, it is possible, for example, to use ethylene oxide condensates of long-chain alcohols, carboxylic acids,, phenols or amines. Compounds of all these types are commercially available. It is also possible to use non-ionic condensates of poly-alcohols and fatty acids or of poly-alcohols and a resin-forming acid, for example phthalic acid, in the manufacture of self-emulsifying preparations. Typical anionic agents used are those based on alcohol sulphonates, sulphates or sulphosuccinates. Cationic surface-active agents which are soluble in solvents are,, for example, oleyl-benzyl-dimethyl-ammonium chloride, or dodecylbenzyl-trimethyl-ammonium chloride or bromide. It may be seen from this that the properties of the emulsifier are unimportant, provided that it is soluble in the solution of the active substance in one or more inert organic solvents.

A wettable powder may be obtained by taking up an active substance of Formula I in a volatile solvent, for example acetone, and mixing with a finely divided solid substance, for example kaolin, pyrophyllite, or diatomaceous earth, and evaporating off the solvent. The powder is heated with small quantities of one or more wetting and dispersing agents. A typical composition, for example, consists of 20 parts of an active substance of Formula I, 77.5 parts of one or more finely divided solid substances, 0.5 part of a wetting agent, for example, an octylphenoxy-polyethoxyethanol, and 2 parts of the sodium salt of a condensed naphthalene-formaldehyde-sulphonate.

Dusts containing 5–10% of the active material can be manufactured by diluting such a wettable powder with a finely divided solid carrier. If desired, the wetting agent may be omitted. The dispersing agent may, if desired, also be omitted or replaced by others.

Each of the fungicidal preparations described above usually contains a carrier, and in most cases contains a surface-active agent.

The materials according to the invention may be applied by themselves or mixed with other fungicidally active substances.

As such substances, there may for example be quoted: thiocarbamates, for example maneb, zineb, ferbam or ziram, and thiurams, for example TMTD, DPTD, Metiram, chloronitrobenzenes, captan, dithianone, dodine, Karathan and Wepsyn.

The following examples illustrate the invention. The parts, unless otherwise stated, denote parts by weight and the percentages denote percentages by weight.

EXAMPLE 1

(1) 50 g. of m-thiocresol are dissolved in 100 cm.³ of dimethylformamide and a solution of 16 g. of sodium hydroxide in 16 cm.³ of water is added. Thereafter, the mixture is cooled to 20° C. and 100 g. of 2-trifluoromethyl-4-nitrochlorobenzene is added drop by drop, whilst maintaining temperature between 20° C. and 30° C. by external cooling. After the reaction mixture has been stirred for 4 hours at room temperature, the sodium chloride which has separated out is filtered off, the solvent is distilled off and the residue is subjected to a distillation in a high vacuum, 80 g. of a product of formula

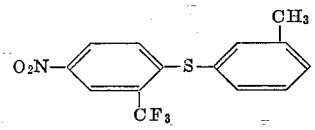

having a boiling point of 125° C. at 0.02 mm. Hg are thus obtained.

The following compounds were also manufactured in an analogous manner:

(2) O₂N—⟨⟩(CF₃)—S—⟨⟩—Cl        Melting point: 70° C.–75° C.

(3) O₂N—⟨⟩(CF₃)—S—⟨⟩—CH₃       Boiling point: 148° C.–151° C. (0.3 mm.).

(4) O₂N—⟨⟩(CF₃)—S—⟨⟩—NO₂       Melting point: 108° C.–112° C.

(5) O₂N—⟨⟩(CF₃)—S—⟨⟩(CH₃)       Boiling point: 134° C.–138° C. (0.05 mm.).

(6) O₂N—⟨⟩(CF₃)—S—⟨⟩(CH₃)—C(CH₃)₃       Boiling point: 160° C.–168° C. (0.005 mm.).

(7) O₂N—⟨⟩(CF₃)—S—⟨⟩—(CH₂)₈CH₃       Boiling point: 186° C.–188° C. (0.03 mm.).

(8) O₂N—⟨⟩(CF₃)—S—⟨⟩       Boiling point: 130° C.–134° C. (0.01 mm.).

(9) O₂N—⟨⟩(CF₃)—S—⟨⟩(Cl)—Cl       Boiling point: 170° C. (0.09 mm.).

(10) O₂N—⟨⟩(CF₃)—S—⟨⟩—Br       Boiling point: 175° C.–180° C. (0.01 mm.).

(11) O₂N—⟨⟩(CF₃)—S—⟨⟩—F       Boiling point: 123° C.–125° C. (0.03 mm.).

(12) O₂N—⟨⟩(CF₃)—S—⟨⟩(CH₃)—C(CH₃)₃       Boiling point: 167° C.–175° C. (0.01 mm.).

EXAMPLE 2

10 parts of compound No. 1 are mixed with 10 parts of a mixture of an anionic surface-active compound, preferably the calcium or magnesium salt of monolaurylbenzene-mono-sulphonic acid, and a non-ionic surface-active compound, preferably a polyethylene glycol ether of monosorbital laurate, and the whole is dissolved in a little xylene. The solution is made up to 100 cc. with xylene.

A clear solution is thus obtained, which is used as a spraying agent concentrate and which can be emulsified by pouring into water.

EXAMPLE 3

500 g. of compound No. 12, 335 g. of chalk and 110 g. of a purified sulphite cellulose waste lye (Peridan NH₄) are thoroughly mixed, and thereafter 45 g. of sodium methylene-bis-naphthalene-disulphonate and 10 g. of a condensation product of 1 mol of p-tert. octylphenol with about 8 mols of ethylene oxide are added to the mixture, and the whole is ground in a pin mill. The mixture so obtained is a spraying powder, which can be diluted with water to any desired dilution, to give a stable spraying liquor.

EXAMPLE 4

Young tomato plants (*Solanum hycopersicum* L.) were treated with a spraying liquor containing 0.1% active substance No. 1.

Two days after the treatment, the plants were infected with a spore suspension of *Alternaria solani* (E. et M.) J. et Gr. After 12 days the attack was evaluated, with compound No. 1 showing a 95% effect against *Alternaria solani*. The untreated control showed 0% effect. The active substances Nos. 2 to 12 listed in the table of Example 1 showed a similar effect.

A similar, good effect was shown by the active substances Nos. 1 to 12 listed in the table of Example 1, when used at the same concentration against *Septoria apii* on celery plants.

What is claimed is:

1. A compound of the general formula

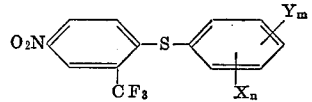

wherein X represents a halogen atom, an alkyl group having 1 to 12 carbon atoms or the groups —OCH₃, —NO₂ or —CF₃, Y represents a halogen atom or an alkyl group having 1 to 4 carbon atoms, and $n$ and $m$ denote the numbers 0 to 3, the sum of $n$ and $m$ being not greater than 5.

2. A compound as claimed in claim 1 of the formula

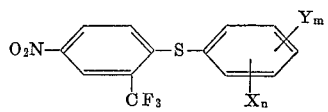

wherein X represents a halogen atom or an alkyl group of at most 4 carbon atoms, Y represents an alkyl group of at most 4 carbon atoms, and $n$ and $m$ denote the numbers 0 or 1.

3. The compound as claimed in claim 1 of the formula

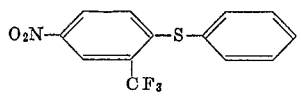

4. The compound as claimed in claim 1 of the formula

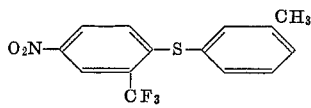

5. The compound as claimed in claim 1 of the formula

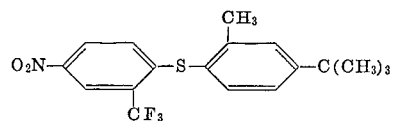

6. The compound as claimed in claim 1 of the formula

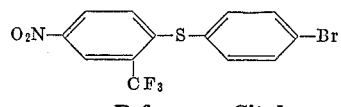

References Cited

UNITED STATES PATENTS 3,420,892   1/1969   Martin et al. _____ 260—609 XR

CHARLES B. PARKER, Primary Examiner

D. R. PHILLIPS, Assistant Examiner

U.S. Cl. X.R.

71—98; 424—337